US009536233B2

(12) United States Patent
Piepenbrink et al.

(10) Patent No.: US 9,536,233 B2
(45) Date of Patent: *Jan. 3, 2017

(54) PURCHASING A GIFT USING A SERVICE PROVIDER NETWORK

(75) Inventors: David Piepenbrink, Chicago, IL (US);
Lee M. Chow, Naperville, IL (US);
Sudha Gopal, Plano, TX (US); Helen Ly, Alameda, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1421 days.

This patent is subject to a terminal disclaimer.

(21) Appl. No.: 11/941,199

(22) Filed: Nov. 16, 2007
(Under 37 CFR 1.47)

(65) Prior Publication Data

US 2009/0132383 A1    May 21, 2009

(51) Int. Cl.
| | |
|---|---|
| *G06Q 30/00* | (2012.01) |
| *G06Q 20/12* | (2012.01) |
| *G06Q 20/10* | (2012.01) |
| *G06Q 30/06* | (2012.01) |

(52) U.S. Cl.
CPC .......... *G06Q 20/123* (2013.01); *G06Q 20/102* (2013.01); *G06Q 30/06* (2013.01); *G06Q 30/0601* (2013.01)

(58) Field of Classification Search
CPC ............................... G06Q 30/00; G06Q 20/00
USPC ...................................................... 705/26, 27
See application file for complete search history.

(56) References Cited

U.S. PATENT DOCUMENTS

| | | | |
|---|---|---|---|
| 7,409,208 B1* | 8/2008 | Clare et al. ................... 455/419 |
| 2003/0050815 A1* | 3/2003 | Seigel et al. ....................... 705/7 |
| 2004/0139318 A1* | 7/2004 | Fiala et al. ..................... 713/165 |
| 2005/0240588 A1* | 10/2005 | Siegel et al. ....................... 707/9 |
| 2005/0246193 A1* | 11/2005 | Roever et al. ..................... 705/1 |
| 2005/0261988 A1 | 11/2005 | Horel et al. |
| 2006/0190966 A1* | 8/2006 | McKissick et al. ............ 725/61 |
| 2007/0005491 A1 | 1/2007 | Koho |

(Continued)

OTHER PUBLICATIONS

"Holiday Cheer Never Sounded So Good, as At&T Wireless Customers Can Now Send and Receive Ring Tones as Gifts," PR Newswire Nov. 19, 2002, ProQuest Dialog #443694608, 4pgs.*

(Continued)

*Primary Examiner* — Rob Pond
(74) *Attorney, Agent, or Firm* — Jackson Walker L.L.P.

(57) ABSTRACT

A system facilitates a first user providing a second user with a gift through a service provider network. A first user may provide an asset such as a ring tone for use on the second user's mobile device. Alternatively, the first user may provide a monetary credit to the second user. Embodied systems are enabled for charging or billing an account associated with the first user and notifying the first user of a successful transaction including receipt or use of the gift. In some embodiments, a service delivery platform communicates with a unified storefront and a payment module for receiving and processing gift requests and payments. Gifts may be requested through an interface associated with the first user's IPTV set-top box. In addition, gifts may be presented to the second user by an interface associated with the second user's set-top box. The unified storefront allows access to gifting through mobile devices and other networked data processing systems in addition to set-top boxes.

23 Claims, 3 Drawing Sheets

(56) References Cited

U.S. PATENT DOCUMENTS

| | | |
|---|---|---|
| 2007/0055567 A1 | 3/2007 | Viitaharju |
| 2007/0143189 A1* | 6/2007 | Mitchem .......................... 705/26 |
| 2007/0150411 A1 | 6/2007 | Addepalli et al. |
| 2008/0066114 A1* | 3/2008 | Carlson et al. ................. 725/61 |

OTHER PUBLICATIONS

Komando, Kim: "Sites can put zine in cell phone rings," Gannett News Service, Feb. 28, 2005; ProQuest Dialog #450240062, 3pgs.*

* cited by examiner

PURCHASING A GIFT USING A SERVICE PROVIDER NETWORK

BACKGROUND

1. Field of the Disclosure

The present disclosure generally relates to service provider networks and more particularly to systems and methods for facilitating gift purchases within a service provider network.

2. Description of the Related Art

Service provider networks provide multimedia content such as video-on-demand movies and pay-per-view sporting events. In addition, service provider networks may provide mobile telephone services, text-messaging services, email services, instant messaging services, and the like. Service provider networks charge fees for many of these services. Some items accrue charges on a per-item basis. For example, a service provider network may charge a user fee for downloading from a service provider network a ring tone for a mobile telephone.

DESCRIPTION OF THE EMBODIMENT(S)

Figure 1:
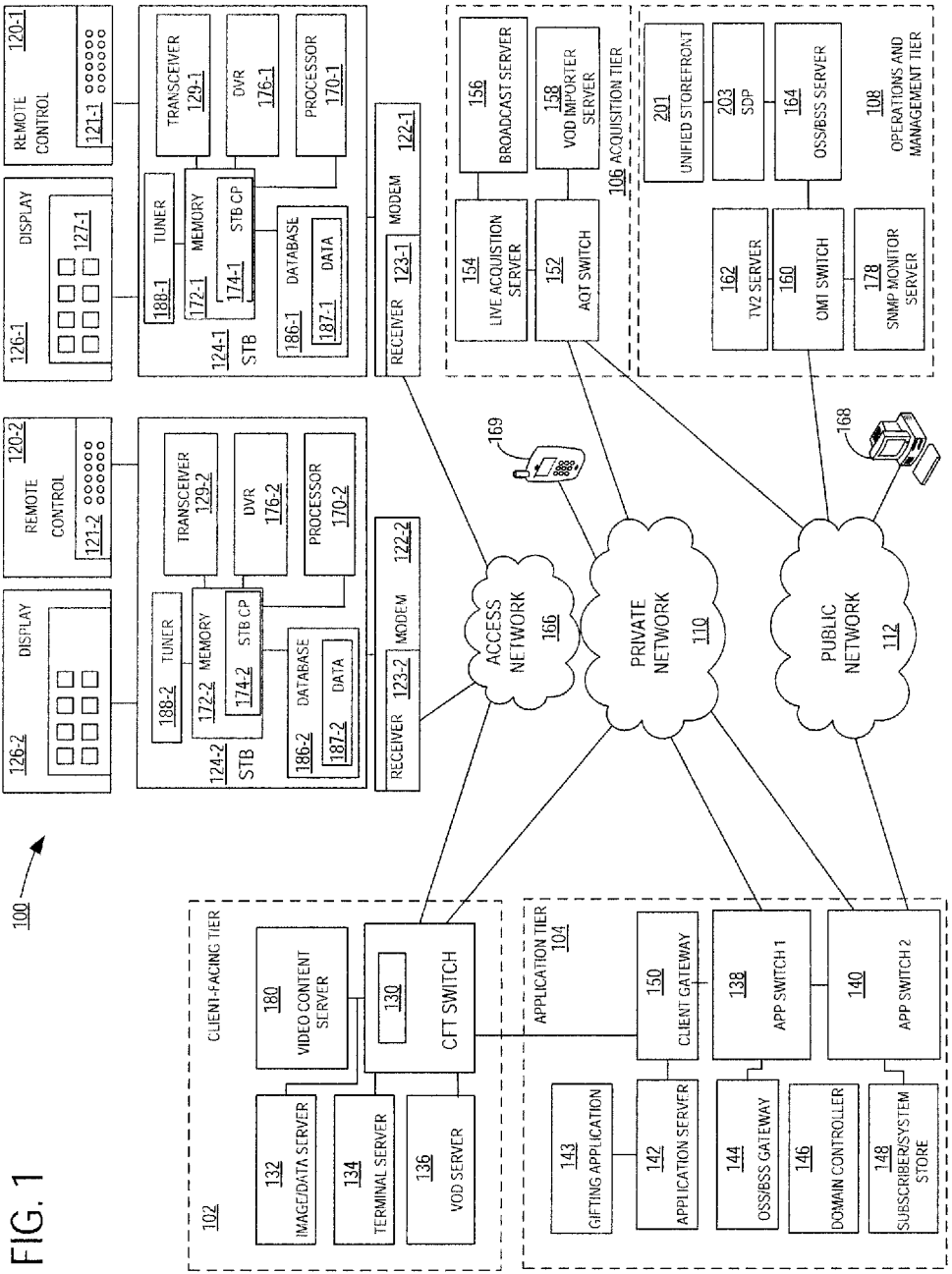
FIG. 1 illustrates a representative Internet Protocol Television (IPTV) system for implementing disclosed embodiments.

In one aspect, a method is disclosed for facilitating a first user purchasing a gift for a second user through a service provider network. The method comprises receiving a first request to purchase a gift for the second user. The method further includes notifying a service delivery platform of the first request to purchase the gift. The method includes notifying a second user of the gift and receiving a payment associated with the first user, wherein the payment is for the gift. The gift may be an asset such as a ring tone or movie-on-demand. The gift may also be a monetary credit applied to a billing account of the gift recipient. In some embodiments, receiving the payment from the first user for the gift includes accessing a payment module using one or more payment credentials provided by the first user. The method may include verifying for payment purposes one or more payment credentials of the first user and requesting compensation from a billing system using the plurality of credentials. The method may also include a unified storefront receiving a first request to purchase the gift, wherein the unified storefront notifies the service delivery platform of the first request. The method may also include updating a billing account associated with the one or more payment credentials.

In another aspect, a unified storefront computer program product is disclosed that is stored on computer readable medium. The computer program product has instructions operable for receiving a request for a first user to purchase a gift for a second user. Instructions are further operable for conveying the request to a service delivery platform and receiving payment information for the first user. The unified storefront computer program may also have instructions for conveying to the service delivery platform payment credentials. Additionally, there may be further instructions operable for processing a request from the first user specifying a type of movie that can be purchased using the gift. In addition, instructions are operable for processing a request from the first user specifying characteristics of music that can be purchased using the gift.

In addition, an application server communicatively coupled to a service provider network is disclosed, wherein the service provider network provides IPTV content and the application server is enabled for executing software code stored on a computer readable medium. The software code has instructions for receiving a gift request notification from a first set-top box. There are further instructions for notifying a billing system of a required payment for the gift. Further instructions are operable for receiving a payment notification that the required payment has been secured to result in a secured payment, wherein the secured payment corresponds to the gift request notification. Further instructions are operable for notifying a second set-top box of an available gift corresponding to the gift request notification.

In the following description, for the purposes of explanation, numerous specific details are set forth in order to provide a thorough understanding of the disclosed embodiments. A person of ordinary skill in the art should recognize that embodiments might be practiced without some of these specific details. In other instances, well-known structures and devices may be shown in block diagram form or omitted for clarity.

Television programs, movies, radio programming and other multimedia content may be distributed over telephone company networks, coaxial-based networks, satellite transmissions, WiFi transmission, WiMAX transmission, and the like. In some systems, for example traditional coaxial-based "cable" systems, a service provider may distribute through the same coaxial or fiber-optic cable a compound signal containing a number of television channels at different frequencies. In conjunction, a set-top box or a tuner within a television, radio, or recorder selects one or more channels from the compound signal to play or record. In contrast to such systems that simultaneously distribute every available channel at all times, Internet Protocol Television (IPTV) systems generally distribute content only in response to user requests. Such IPTV systems typically use Internet Protocol (IP) and other technologies found in computer networks. To provide IPTV, a user's telephone lines may be used in some combination with a residential gateway (RG), a digital subscriber line (DSL) modem, a set-top box (STB), a display, and other such equipment to receive and convert into usable form the multimedia content provided from a telephone company network, for example.

IPTV providers, satellite-based providers, digital cable providers, and others may distribute multimedia content using bidirectional (i.e., two-way) communication between a user's customer premises equipment (CPE) and the service provider's equipment. Bidirectional communication allows a service provider to offer advanced features, such as video-on-demand (VOD), pay-per-view, advanced programming information, text-based news, and the like.

Using disclosed embodiments, a user of a service provider network is presented with the option of either providing a monetary credit or an asset as a gift to another user of the service provider network. In an IPTV network, for example, an asset may include multimedia content such as a pay-per-view sporting event, a video-on-demand movie, a pod cast, or the like. An asset may also include an album, a song, a music video, and other forms of multimedia content for such networks. If a first user decides to provide a second user with an asset, provisions may be made for determining the compatibility of the asset for the particular user. For example, if the service provider network includes mobile telephone services and the gifted asset is a ring tone for a mobile telephone, provisions may be made for automatically choosing a ring tone that is compatible with the second user's mobile telephone device. This allows a first user to provide a gift to a second user without the first user worrying whether the gift can be used by the second user's electronic appliances. A gifted asset may also include an hour of telephone talk time or a given number of text messages. In some service provider networks, text messages are charged a fee for each message. Using disclosed embodiments, a first user could gift a second user a given number of text messages. In some embodiments, a first user may attach conditions to a gift. For example, a first user may specify that the gifted asset include a given number of text messages that can only be sent to the second user. In this way, a first user may provide the second user with a way to communicate with the first user without the second user undergoing any expense. Such a system would be useful in a business arrangement, where a business wants to cover all costs associated with contacting business assets. In other scenarios, a parent could provide a child with gifted assets for communicating with the parent. Similarly, in some embodiments a first user may condition the gift of a video-on-demand movie on the second user choosing a movie with family-oriented content, for example. In other embodiments, a first user may specify a particular title of a movie as the gifted asset. In a similar way, first users may condition the gift of monetary value to a second user. For example, the first user may provide a gift to the second user in the form of a $20 credit for use with any video-on-demand movie that has a family-oriented rating. In this way, a first user has many options using disclosed embodiments for providing assets and monetary credits to a second user.

Referring now to the drawings, FIG. 1 illustrates selected aspects of an IPTV system 100 operated as part of a service provider network. Throughout this disclosure, a hyphenated form of a reference numeral refers to a specific instance of an element and the un-hyphenated form of the reference numeral refers to the element generically or collectively. Thus, for example, reference numeral 124-1 refers to an instance of an element 124. As shown in FIG. 1, IPTV system 100 includes two set-top boxes (STBs) 124 including set-top box 124-1 and set-top box 124-2. In the depicted embodiment, set-top boxes 124 communicate through access network 166 via modems 122 (i.e., modem 122-1 and modem 122-2).

As shown, IPTV system 100 is configured to provide multimedia content to users of set-top boxes 124 and includes a client facing tier 102, an application tier 104, an acquisition tier 106, and an operations and management tier 108. In addition, IPTV system 100 may provide multimedia content to personal computer 168 and mobile device 169, which may be a mobile telephone. Each tier 102, 104, 106 and 108 is coupled to a private network 110, to a public network 112 (e.g., the Internet), or to both the private network 110 and the public network 112. Any of the various tiers coupled to the various networks may communicate with each other over the networks. For example, as shown, the client-facing tier 102 may communicate through the private network 110 with the acquisition tier 106. Further, as shown, the application tier 104 may communicate through the private network 110 and the public network 112 with the acquisition tier 106. The interconnections between illustrated tiers and networks in FIG. 1 are meant as instructive and not limiting.

As shown, IPTV system 100 distributes multimedia content to users of set-top boxes 124 for viewing on displays 126 and possibly for sending to other components not shown, such as a portable media player. In order to distribute the multimedia content, IPTV system 100 must first gain access to the multimedia content. To that end, acquisition tier 106 represents a variety of systems to acquire multimedia content, reformat it when necessary, and prepare it for transmission over private network 110 or public network 112. In its capacity at acquiring and distributing multimedia for use on IPTV system 100, acquisition tier 106 serves as a "content headend." Acquisition tier 106 may include, for example, systems for capturing analog and/or digital content feeds, either directly from a content provider or from a content aggregation facility. Content feeds transmitted via VHF/UHF broadcast signals may be captured by broadcast server 156. Similarly, live acquisition server 154 may capture satellite signals, high-speed fiber feeds, or programming feeds sent over other suitable transmission means. Content feeds to live acquisition server 154 may include broadcasted multimedia content, for example premium audio/video programming (i.e., traditional "cable channels") widely available but not typically broadcast over airwaves. Acquisition tier 106 may further include signal conditioning systems and content preparation systems for encoding content. As shown, acquisition tier 106 includes video on demand (VoD) importer server 158 and may include a digital rights management (DRM) server for encrypting content (not shown). VOD importer server 158 receives content from one or more VOD sources that may be outside the IPTV system 100, for example discs or transmitted feeds. VOD importer server 158 may temporarily store multimedia content for transmission to a VOD server 136 on client-facing tier 102. In addition, the VOD content may be stored at one or more servers, such as the VOD server 136. The stored VOD content may be distributed by multicast (i.e., a single stream sent simultaneously to multiple viewers) or by unicast to individual users in a VOD system.

After acquiring the multimedia content, IPTV system 100 distributes the content over private network 110, for example. Private network 110 may be referred to as a "core network." In some embodiments, private network 110 consists of a fiber backbone (i.e. WAN) and one or more video hub offices (VHOs). Generally, private network 110 transports multimedia content (e.g. video, music, Web pages, channel lineups, and data) from the acquisition tier 106 to set-top boxes 124 through access network 166 (via client-facing tier (CFT) switch 130). In this role, private network 110 serves as the "backbone" for IPTV system 100. In a large deployment of IPTV system 100 that covers a vast geographic region, private network 110 may represent several smaller networks that each may only transfer content within a subset of the region. Accordingly, private network 110 may provide for the insertion of local content that is relevant only to a subset region. For example, private network 110 may allow for the localized insertion of local advertisements or local emergency alert systems for a particular service area.

To illustrate the distribution of multimedia content acquired by acquisition tier 106, in an example embodiment, broadcast server 156 acquires broadcast multimedia content and communicates it to live acquisition server 154. Live acquisition server 154 transmits the multimedia content to the AQT (AcQuisition Tier) switch 152. In turn, the AQT switch 152 transmits the multimedia content to the CFT switch 130, for example, via the private network 110. As shown, the CFT switch 130 may communicate the multimedia content through modems 122 via the private access network 166. In some embodiments, set-top boxes 124 receive the multimedia content via modems 122 and transmit it to displays 126.

In some embodiments, live acquisition server 154 and VOD importer server 158 take numerous data streams and encode them into a digital video format, such as MPEG-2, or MPEG-4. After encoding, data streams may be encapsulated into IP data streams and transmitted to specific IP destinations (e.g. set-top boxes 124) in response to a user's request for a particular channel, for example. Video content server 180, VOD server 136, or image/data server 132 may act as an intermediary or repository for multimedia content obtained and encoded by acquisition tier 106. In some embodiments, multimedia content is transmitted to the video content server 180, where it is encoded, formatted, stored, or otherwise manipulated and prepared for communication to the set-top box 124.

As shown, IPTV system 100 includes access network 166. Access network 166 provides a network link from the private network 110 to each consumer's location. To this end, access network 166 provides a network translation as necessary from a switched network, for example, to the access technology used to transmit data and multimedia content to the consumer's location. For example, a service provider that uses twisted-pair telephone lines to deliver multimedia content to consumers may utilize digital subscriber lines within access network 166. The digital subscriber lines may utilize some combination of DSL, DSL2, DSL2+, ADSL, VDSL or other technologies. In some embodiments, access network 166 may use fiber-to-the-home (FTTH). In such cases, optical fiber may be used all the way to the consumer's location to provide high-bandwidth. In other embodiments, fiber-to-the-curb (FTTC) deployments are used to deliver multimedia content to consumers. In such cases, a digital subscriber line access multiplexer (DSLAM) may be used within access network 166 to transfer signals containing multimedia content from optical fiber to copper wire for DSL delivery to consumers. In other embodiments, access network 166 may use RF signals sent over coaxial cables. Accordingly, access network 166 may utilize quadrature amplitude modulation (QAM) equipment for downstream traffic. In these systems, access network 166 may receive upstream traffic from a consumer's location using quadrature phase shift keying (QPSK) modulated RF signals. In such systems, a cable modem termination system (CMTS) may be used to mediate between IP-based traffic on private network 110 and access network 166.

In operation, if a user requests VOD content via a set-top box 124, the request may be transmitted over the access network 166 to VOD server 136, via the CFT switch 130. Upon receiving the request, the VOD server 136 retrieves or accesses the requested VOD content and transmits the content to the set-top box 124 across access network 166 via CFT switch 130. In turn, set-top box 124 transmits relevant video portions of the VOD content to the display 126. Set-top box 124 may transmit audio portions of the VOD content to a stereo system (not shown) or may allow (or disallow) sending the VOD content to a recording device (not shown).

As shown, IPTV system 100 includes application tier 104. Application tier 104 communicates with acquisition tier 106 and client-facing tier 102 through private network 110. Application tier 104 may communicate through various communication protocols including hypertext transfer protocol (HTTP). Generally, application tier 104 may include notification servers, billing servers, and any of a variety of subscriber application servers employed by an owner or operator (i.e. network service provider) of IPTV system 100. In some embodiments, elements of the application tier 104 such as client gateway 150 communicate directly with the client-facing tier 102. The components of client-facing tier 102 may communicate using HTTP, transmission control protocol (TCP) or datagram protocol (UDP), as examples.

As illustrated in FIG. 1, the client-facing tier 102 is coupled for communication with user equipment (e.g. modems 122) via access network 166. Access network 166 may be referred to as the "last mile" for a service provider or network operator. It provides network connectivity of IPTV services to consumers' locations. Client-facing tier 102 may be required to multicast multimedia content to multiple destinations. For example, the same multimedia content may be distributed substantially simultaneously to set-top box 124-1 and set-top box 124-2. In contrast to a multicast or a unicast, some embodiments "broadcast" programming or data to all users on a network as a "broadcast" transmission. For example, a TV guide feature for displaying available programming may be broadcast to every user.

To deliver multimedia content, client-facing tier 102 may employ any current or future Internet protocols for providing reliable real-time streaming multimedia content. In addition to the TCP, UDP, and HTTP protocols discussed above, such protocols may use, in various combinations, other protocols including, file transfer protocol (FTP), real-time transport protocol (RTP), real-time control protocol (RTCP), and real-time streaming protocol (RTSP), as examples. In some embodiments, client-facing tier 102 sends multimedia content encapsulated into IP packets over access network 166. For example, an MPEG-2 transport stream may be sent, in which the transport stream consists of a series of 188-byte transport packets, for example. To ensure quality of service, protocols should be chosen that minimize dropped packets, jitter, delay, data corruption, and other errors.

As shown, the client-facing tier 102 may communicate with a large number of set-top boxes, such as representative set-top boxes 124, over a wide area, which may be for example, a regional area, a metropolitan area, a viewing area, a designated market area, or any other suitable geographic area, market area, or user group supported by networking the client-facing tier 102 to numerous set-top boxes. In an illustrative embodiment, the client-facing tier 102, or any portion thereof, may be included at a video headend office (not depicted).

In some embodiments, the client-facing tier 102 may be coupled to modems 122 via fiber optic cables. Alternatively, modems 122 may be DSL modems coupled to one or more network nodes via twisted pairs. Each set-top box 124 may process data received over the private access network 166 via various IPTV software platforms that are commonly known.

In an illustrative embodiment, the client-facing tier 102 includes a CFT switch 130 that manages communication between the client-facing tier 102 and the private access network 166. CFT switch 130 also manages communication between the client-facing tier 102 and the private network 110 and is coupled to an image and data server 132 that may store streaming multimedia content and possibly still images associated with programs of various IPTV channels. Image and data server 132 stores data related to various channels, for example, types of data related to the channels and to programs or video content displayed via the channels. In an illustrative embodiment, image and data server 132 may be a cluster of servers, each of which may store streaming multimedia content, still images, channel and program-related data, or any combination thereof. CFT switch 130 may also be coupled to terminal server 134 that provides terminal devices with a connection point to the private network 110. As shown, CFT switch 130 may also be coupled to VOD server 136 that stores or provides VOD content imported by the IPTV system 100. As shown, the client-facing tier 102 also includes video content server 180 that transmits video content requested by viewers to set-top boxes 124. In some embodiments, video content server 180 includes one or more multicast servers.

As illustrated in FIG. 1, application tier 104 may communicate with numerous components through private network 110 and public network 112. As shown, application tier 104 includes a first application tier (APP) switch 138 and a second APP switch 140. The first APP switch 138 is coupled to the second APP switch 140 and a combination operation-systems-support (OSS) and billing-systems-support (BSS) gateway 144 (i.e., OSS/BSS gateway 144). In some embodiments, the OSS/BSS gateway 144 controls access to an OSS/BSS server 164 that stores operations and billing systems data. As shown, OSS/BSS server 164 communicates with service delivery platform ("SDP") 203. In disclosed embodiments, service delivery platform 203 processes requests from unified storefront 201 that are related to gift requests from a user of set-top box 124-1, for example. Unified storefront 201 may host a web-based interface accessible by set-top box 124-1 for requesting the gift. In addition, the unified storefront 201 may host a similar interface accessible by mobile device 169 or personal computer 168. In accordance with disclosed embodiments, unified storefront 201 and service delivery platform 203 assist in the processing of gift requests as well as the billing of required payments associated with the gift requests. In addition, unified storefront 201 may host an interface accessible by a second user, for example a user of set-top box 124-2, to present the second user with the gift. Service delivery platform 203 may notify a payment module and update credit accounts associated with IPTV system 100 or a telephone network that may be in communication with IPTV system 100.

As shown, application tier 104 includes application server 142. Application server 142 may be any data processing system with associated software that provides information services (i.e. applications) for clients or users. Application server 142 may be optimized to provide services including conferencing, voicemail, and unified messaging. In some embodiments, services include electronic programming guides (EPG), conditional access systems (CAS), digital rights management (DRM) servers, a navigation/middleware server, and IPTV portal, e-mail services, and remote diagnostics. As shown, application server 142 is associated with, communicates with, or hosts gifting application 143. Gifting application 143 may have software code stored on computer readable medium. In some embodiments, the software code has instructions for receiving a gift request notification from set-top box 124-1. The gift request may be associated with an asset such as a ring tone, pay-per-view sporting event, or movie-on-demand, as examples. Alternatively, the gift requests may be associated with a monetary credit, such as by the user of set-top box 124-1 specifying that an account associated with set-top box 124-2 should be credited with $50, for example. In association with the gift request, the first user of set-top box 124-1 may specify that a credit card account corresponding to the first user be billed for the monetary credit provided as a gift to the second user of set-top box 124-2. For security purposes, the first user of set-top box 124-1 may be required to present payment credentials or security credentials to reduce the likelihood of fraud.

The gifting application 143 may have further instructions for notifying a billing system of a required payment for the gift. For example, OSS/BSS server 164 may be accessed to notify IPTV system 100 that a particular multimedia-related asset or monetary credit has been requested for transfer to a gift recipient. OSS/BSS server 164, in turn, may coordinate the transfer of the asset or monetary credit with other components of IPTV system 100. The software code for gifting application 143 may also have instructions for receiving a payment notification that a required payment has been secured. Further instructions in the software code may be operable for notifying a second set-top box and of an available gift corresponding to the gift request notification. In some embodiments, gifting application 143 has instructions for decreasing or for causing to be decreased a spending limit for an account associated with the set-top box 124-1. For security purposes, gifting application 143 may have has instructions for prompting verification of a MAC address of the set-top box 124-1 upon the request of a gift. Upon gifting application 143 receiving notification of gift request, gifting application 143 may prompt set-top box 124-1 to communicate with modem 122-1 or other residential gateway to determine whether set-top box 124-1 is connected to an assigned residential gateway. This step helps prevent a bad actor from using set-top box 124-1 to purchase gifts for another user by removing set-top box 124-1 from a household unit associated with a residential gateway such as modem 122-1.

As shown in FIG. 1, second APP switch 140 is communicatively coupled to a domain controller 146 that provides web access, for example, to users via the public network 112. The second APP switch 140 is communicatively coupled to a subscriber/system store 148 that includes account information, such as account information that is associated with users who access the IPTV system 100 via the private network 110 or the public network 112. Therefore, for example, a user may employ a personal computer 168 to receive IPTV account information via the public network 112. Similarly, a user may employ mobile device 169 or another similar multifunction device over private network 110 or public network 112 to receive information through second APP switch 140. In some embodiments, application tier 104 may also include a client gateway 150 that communicates data directly with the client-facing tier 102. In these embodiments, the client gateway 150 may be coupled directly to the CFT switch 130. Accordingly, the client gateway 150 may provide user access to the private network 110 and the tiers coupled thereto.

In some embodiments, set-top box 124 accesses the IPTV system 100 via the private access network 166, using information received from the client gateway 150. In such embodiments, private access network 166 may provide security for the private network 110. Therefore, user devices may access the client gateway 150 via the private access network 166, and the client gateway 150 may allow such devices to access the private network 110 once the devices are authenticated or verified. Similarly, the client gateway 150 may prevent unauthorized devices, such as hacker computers or stolen set-top boxes, from accessing the private network 110, by denying access to these devices beyond the private access network 166.

Accordingly, in some embodiments, when a set-top box 124 accesses the IPTV system 100 via the private access network 166, the client gateway 150 verifies user information by communicating with the subscriber/system store 148 via the private network 110, the first APP switch 138, and the second APP switch 140. The client gateway 150 verifies billing information and user status by communicating with the OSS/BSS gateway 144 via the private network 110 and the first APP switch 138. The OSS/BSS gateway 144 may transmit a query across the first APP switch 138, to the second APP switch 140, and the second APP switch 140 may communicate the query across the public network 112 to the OSS/BSS server 164. Upon the client gateway 150 confirming user and/or billing information, the client gateway 150 allows the set-top box 124 access to IPTV content, VOD content, and other services. If the client gateway 150 cannot verify user information for the set-top box 124, for example, because it is connected to an unauthorized twisted pair or residential gateway, the client gateway 150 may block transmissions to and from the set-top box 124 beyond the private access network 166.

Set-top boxes 124 convert digital compressed signals into a format suitable for display. Set-top boxes 124 have functionality for recognizing and acting on IP packets, for example UDPs transmitted within IP datagrams. Set-top boxes 124 may contain software or firmware coding for sending requests to application server 142, for example, to receive requested programming or data. In some embodiments, requests for content (e.g. VOD content) flow through a billing or management server to verify that a user is not in arrears regarding payment. In some embodiments, set-top box 124 supports Web browsing on the Internet (e.g., public network 112) and may support cycling through guide data, for example, using Web services. Each set-top box 124 may be enabled for viewing e-mail, viewing e-mail attachments, and interfacing with various types of home networks.

In accordance with disclosed embodiments, each set-top box 124 may be a cable box, a satellite box, or an electronic programming guide box. Further, although shown separately, set-top boxes 124 may be incorporated into any multifunctional device such as, a television, a videocassette recorder, a digital video recorder, a computer, a personal computer media player, or other media device. Generally, set-top boxes 124 each represent a dedicated data processing system (e.g., computer) that provides an interface between a display and a service provider. As shown, set-top boxes 124 are connected to the service provider through modems 122. Although modems are shown in FIG. 1, other residential gateways may be employed. Alternatively, set-top boxes 124 may be connected directly to access network 166.

Set-top boxes 124 contain software or firmware instructions stored in memories 172 or other storage for receiving and processing input from remote controls 120. In some embodiments, set-top boxes 124 are IP based set-top boxes and have capability for outputting resultant multimedia signals (e.g., streaming audio/video) in various formats including S-video, composite video, high definition component video, high definition multimedia interface (HTMI), and video graphics array (VGA) signals. The resultant multimedia signals may support displays 126 that have various video modes including analog NTSC, 1080i, 1080p, 480i, 480p, 720p, as examples. In some embodiments, set-top boxes 124 communicate with modems 122 over local area networks (LANs) connected using CAT5 cables, CAT6 cables, wireless interfaces, or a Home Phoneline Networking Alliance (HPNA) network, as examples.

As shown set-top boxes 124 are coupled to displays 126. Each display 126 may include a cathode ray tube (CRT), television, monitor, projected image, LCD screen, holograph, or other graphical equipment. In accordance with disclosed embodiments, displays 126 present gift choices that may include streaming video of available gift assets in an IPTV network.

Set-top boxes 124 communicate with remote controls 120. In accordance with disclosed embodiments, remote controls 120 include selection buttons 121 that a user may depress to request an interface for providing preferences associated with the transfer of a gift. In response to receiving the request for the gift interface, display 126 shows a mosaic of choices associated with gift giving. For example, the mosaic of choices may contain selectable text or selectable icons. Remote control 120 may contain directional selection buttons or numerical selection buttons that may be used to navigate to a particular viewport associated with programming or assets that the user desires to provide as a gift. Remote control 120 may contain a selection button or enter button to select the particular viewport, which may be highlighted or otherwise emphasized on display 126. Set-top boxes 124 may include wireless transceivers 129 to communicate with wireless transceivers (not shown) of remote controls 120. Although the term "buttons" is used to describe some embodiments herein, other forms of input may be used. For example, touch screens associated with remote controls 120 may be used to accept user input. Alternatively, remote controls 120 may be used in conjunction with set-top boxes 124 to operate graphical user interfaces (GUIs) displayed on displays 126.

Set-top boxes 124 may receive multimedia data including video content and audio content from the client-facing tier 102 via the private access network 166. The multimedia content may be associated with a broadcast program that includes streaming multimedia content. The multimedia content may include video-on-demand presentations and pay-per-view sporting events. The multimedia content may include pod casts, web casts, or audio files used for playing on portable audio devices, as examples. As it receives data that includes the multimedia content, set-top box 124 may store the content or may format the content into a resultant multimedia signal for sending to displays 126 and other equipment (not shown) for producing portions of the multimedia content in usable form.

As shown, each set-top box 124 includes an STB processor 170 and an STB memory 172 that is accessible by STB processor 170. An STB computer program (STB CP) 174, as shown, is embedded within each STB memory 172. In accordance with disclosed embodiments, the STB CP 174 may include a client application for calling a gifting application (e.g., gifting application 143) that may be associated with application server 142. As shown, memories 172 are coupled with databases 186 that each include data 187. Data 187 may include currently available assets or gift choices available for giving. In addition, data 187 may contain information regarding user preferences (e.g., a wish list) associated with set-top boxes 124. An application server may access a future gift recipient's stored wish list in order to present a gift purchaser with options for assets that may appeal to the gift recipient.

In addition to or in conjunction with STB components illustrated in FIG. 1, set-top boxes 124 may contain modules for transport, de-multiplexing, audio/video encoding and decoding, audio digital to analog converting, and radio frequency (RF) modulation. For clarity, such details for these modules are not shown in FIG. 1. In addition details are not provided for allowing set-top boxes 124 to communicate through access network 166 through modems 122. However, such communications can be carried out with known protocols and systems for network interfacing such as conventional network interface cards (NICs) used in personal computer platforms. For example set-top box 124 may use a network interface that implements level 1 (physical) and level 2 (data link) layers of a standard communication protocol stack by enabling access to a twisted pair or other form of physical network medium and supporting low level addressing using media access control (MAC) addressing. In these embodiments, set-top boxes 124 may each have a network interface including a globally unique 48-bit MAC address stored in a ROM or other persistent storage element. Similarly, each modem 122 (or other RG) may have a network interface (not depicted) with its own globally unique MAC address. Further, although set-top boxes 124 are depicted with various functions in separate components, these components may be implemented with a system on chip (SoC) device that integrates two or more components.

As shown, set-top boxes 124 may also include a video content storage module, such as a digital video recorder (DVR) 176. In a particular embodiment, set-top boxes 124 may communicate commands received from the remote control devices 120 to the client-facing tier 102 via the private access network 166. Commands received from the remote control devices 120 may be entered via buttons 121.

IPTV system 100 includes an operations and management tier 108 that has an operations and management tier (OMT) switch 160. OMT switch 160 conducts communication between the operations and management tier 108 and the public network 112. The OMT switch 160 is coupled to a TV2 server 162. Additionally, the OMT switch 160 as shown is coupled to an OSS/BSS server 164 and to a simple network management protocol (SNMP) monitor server 178 that monitors network devices within or coupled to the IPTV system 100. In some embodiments, the OMT switch 160 communicates with the AQT switch 152 via the public network 112.

In an illustrative embodiment, the live acquisition server 154 transmits the multimedia content to the AQT switch 152, and the AQT switch 152, in turn, transmits the multimedia content to the OMT switch 160 via the public network 112. In turn, the OMT switch 160 transmits the multimedia content to the TV2 server 162 for display to users accessing the user interface at the TV2 server 162. For example, a user may access the TV2 server 162 using a personal computer (PC) 168 coupled to the public network 112.

Embodiments disclosed herein use IPTV system 100 to facilitate a first user providing a second user with a gift that may be a monetary credit or asset. The first user may access a unified storefront using a set-top box, a personal computer, or a mobile device, as examples. A gifting application may host a frame or template that contains URL calls to gifting options and preferences. In some embodiments, video content server 180 populates the frame using the URL calls or executable instructions to provide a streaming content over access network 166 to set-top box 124 of available assets that are potential gifts. In such cases, the URLs are part of instructions to retrieve at least one multimedia content stream for each available asset gift.

Figure 2:
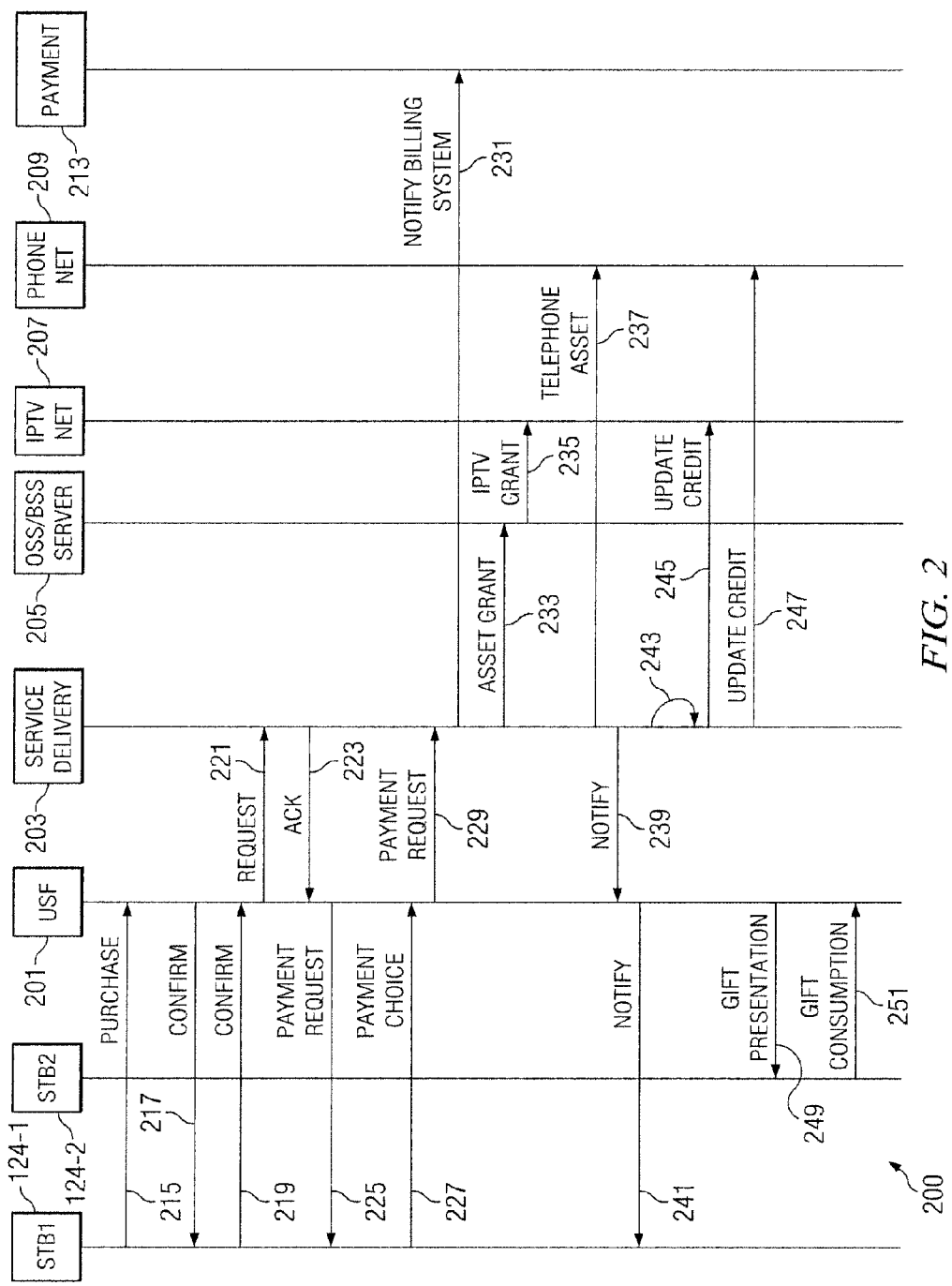
FIG. 2 illustrates a methodology for purchasing an asset using the service provider network from FIG. 1.

FIG. 2 illustrates representative operations of a method 200 for facilitating a first user purchasing an asset for a second user through a service provider network. To perform method 200, a service provider network may be used that is enabled for providing both mobile telephone services and IPTV content. For example, the IPTV system illustrated in FIG. 1 may be used to perform method 200. Operation 215 involves set-top box 124-1 requesting to purchase an asset (e.g., video-on-demand movie, pay-per-view movie, or ring tone) by communicating with unified storefront 201. For example, the user of set-top box 124-1 may initiate a session for requesting an asset by pressing one or more buttons on the remote control 120-1 (FIG. 1) resulting in a graphical user interface being presented on display 126-1 (FIG. 1). The graphical user interface may have selectable icons, selectable text, or a menu system for providing asset purchasing requests and preferences. Using disclosed embodiments, a first user of a first set-top box may request the purchase of an asset or monetary credit for the benefit of a second user. The second user may be associated with the first set-top box or may be associated with a second set-top box. The first user may specify which user is to be the beneficiary of the gift by following menu commands on a display. Embodiments may provide a "look up" feature that accesses a database of known users or known user accounts. Such a database may be enabled to allow the first user to search and select potential recipients of the gifted asset or monetary credit. In some embodiments, a first user provides or enters a unique identification number or account number associated with an intended recipient of a gift. Embodied systems, during a session for a first user requesting an asset, may employ a Tasman browser running on set-top box 124-1 and requesting a URL associated with the unified storefront 201.

In response to operation 215, in operation 217 the unified storefront 201 confirms receipt of the request for the purchase of the asset and asks the user of set-top box 124-1 for verification that he or she wants to purchase the asset. In operation 219, the user of set-top box 124-1 sends confirmation to unified storefront 201 that the user wants to order the asset for the second user of set-top box 124-2. In operation 221, unified storefront 201 sends a request to service delivery platform 203 for the requested asset or content. In operation 223, service delivery platform 203 acknowledges the receipt of the request to unified storefront 201. Upon unified storefront 201 receiving acknowledgment from service delivery platform 203 that the request is being processed by the service delivery platform 203, in operation 225 the unified storefront 201 sends a payment request or other form of invoice. In some embodiments, operation 227 relates to the user of set-top box 124-1 making a payment choice. For example, the user of set-top box 124-1 may enter credit card payment information or other payment credentials to be used in paying for the asset. In some embodiments, credit card information or other payment credentials are stored in set-top box 124-1 or a network server and accessed automatically or in response to a user command. Unified storefront 201 receives the payment choice information in operation 227 and conveys the payment choice information in operation 229 to the service delivery platform 203. Depending upon the payment option selected, the service delivery platform 203 may either send the payment information to payment module 213 or add an entry to a bill payment system associated with the relevant service provider sub-network. For example, one bill payment system may be associated with IPTV network 207 and another bill payment system may be associated with mobile phone network 209. In operation 231, the service delivery platform 203 requests a payment from payment module 213. Payment module 213 may be an external credit card payment system that is subscribed to by the service provider network operator. Payment credentials received during operation 227 may used in operation 231 to promote security and reduce payment fraud, for example. If the asset purchase is a video on-demand movie, for example, in operation 233 the service delivery platform 203 authorizes the grant of rights to the asset by communicating with OSS/BSS server 205. In turn, operation 235 involves OSS/BSS server 205 authorizing IPTV network 207 to grant access to a second user of set-top box 124-2. In some embodiments, the second user of set-top box 124-2 logs into the set-top box or otherwise provides security credentials to allow unified storefront 201 to verify that the person using set-top box 124-2 is the appropriate asset recipient. Other embodiments may allow access to the asset by any user of set-top box 124-2, without regard to whether a particular user of the set-top box receives the gifted asset or monetary credit. If the gifted asset is a telephone asset such as a ring tone, in operation 237, service delivery platform 203 grants authorization to telephone network 209 to provide a second user (i.e. asset recipient) with the ring tone. In operation 239, service delivery platform 203 notifies unified storefront 201 that the service delivery platform 203 coordinated the grant of the gifted asset with the appropriate network (e.g., IPTV network 207 or telephone network 209) and that payment has been requested. In turn, in operation 241 unified storefront 201 notifies the user of set-top box 124-1 of the status of the transaction. In some embodiments, notification provided in operation 241 includes information that the assets have been granted and payment has been received or billed. In operation 243, service delivery platform 203 updates relevant spending limits associated with set-top box 124-1 or with an account or user associated with set-top box 124-1. Spending limits associated with set-top box 124-1 may be for a single account associated with the set-top box, or maybe associated with a particular user of set-top box 124-1 in the event that multiple users have corresponding accounts related to the set-top box. In operation 245, service delivery platform 203 prompts IPTV network 207 to update credit limits associated with set-top box 124-1 or the user of set-top box 124-1. Operation 245 occurs if the gifted asset is related to IPTV network 207, such as if the gifted asset is a video-on-demand movie or a pay-per-view sporting event, as examples. In operation 247, if the gifted asset is related to telephone network 209, service delivery platform 203 prompts telephone network 209 to update credit limits associated with set-top box 124-1 or the user of set-top box 124-1. For example, the asset may be related to telephone network 209 if it were a ring tone or wallpaper associated with an electronic device of the gift recipient. In operation 249, unified storefront 201 presents the gifted asset to the user of set-top box 124-2. Presentation of the gifted asset may be, for example, by an e-mail message, text message, or screen image that may be generated by set-top box 124-2. In operation 251, the user of set-top box 124-2 requests to use or consume the gifted asset. For example, the user of set-top box 124-2 may navigate a graphical user interface presented on display 126-2 using remote control buttons 121-2 on remote control 120-2. By navigating a graphical user interface, the user may select icons or selectable text associated with a video-on-demand movie or pay-per-view sporting event, as examples. In some cases, the gifted asset may be for a particular video-on-demand movie or pay-per-view sporting event. In other cases, the first user (i.e. gift giver) may specify that only certain movie titles or certain classes of movies may be consumed in operation 251 using the gifted asset.

Figure 3:
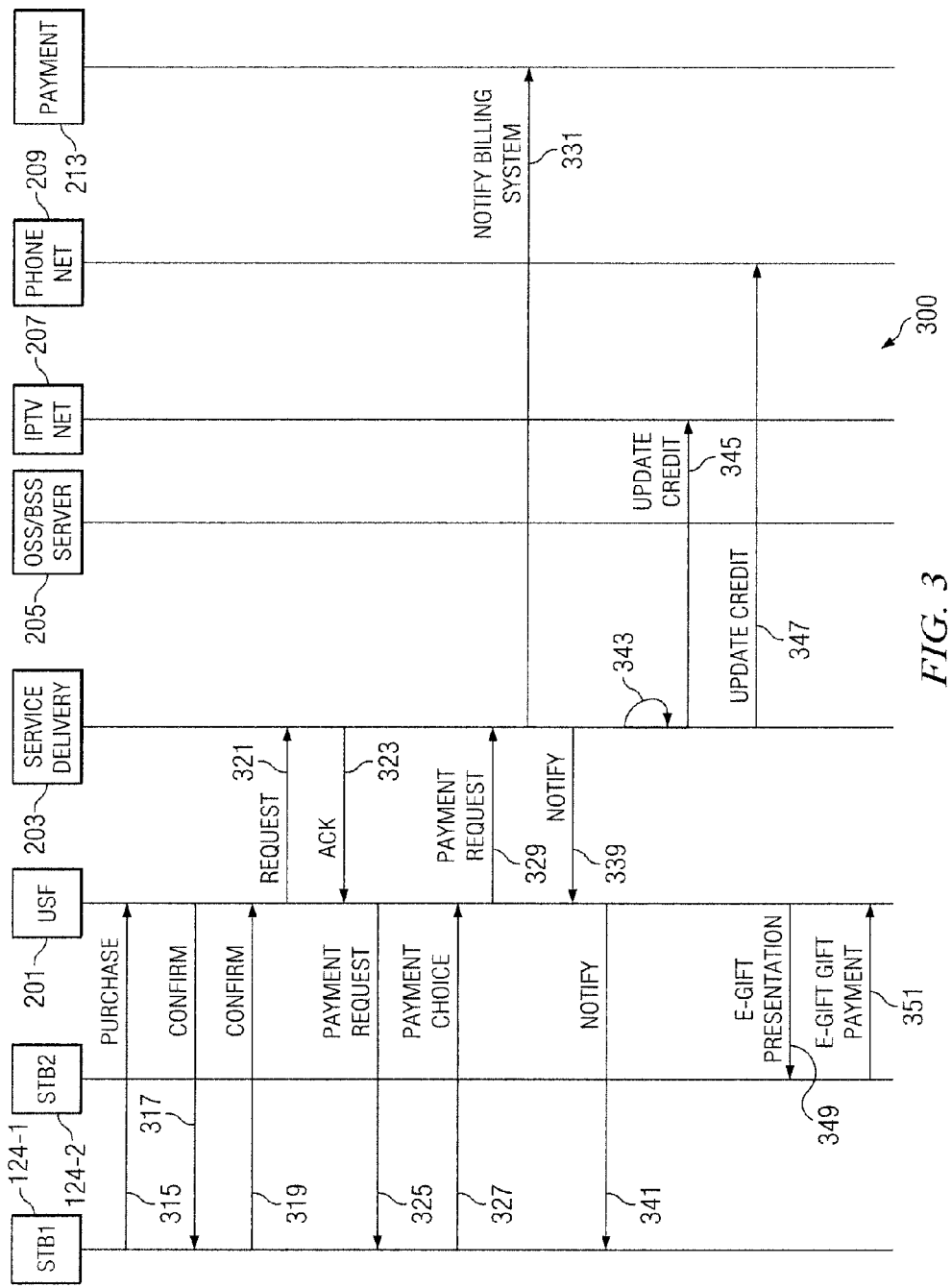
FIG. 3 illustrates a methodology for purchasing a pre-paid amount using a service provider network.

FIG. 3 illustrates representative operations in method 300 for facilitating a first user purchasing a pre-paid amount gift for a second user through a service provider network. Similar to method 200 (FIG. 2), method 300 may be performed by a service provider network that is enabled for providing mobile telephone services and IPTV content. Operation 315 involves set-top box 124-1 requesting the purchase of a pre-paid amount gift to unified storefront 201. For example, the user of set-top box 124-1 may initiate a session for requesting the pre-paid amount gift by pressing one or more selection buttons 121-1 (FIG. 1) on remote control 120-1 (FIG. 1) resulting in a graphical user interface being presented on display 126-1 (FIG. 1). The graphical user interface may have selectable icons 127-1 (FIG. 1), selectable text, or a menu system for providing gift purchasing requests and preferences. The session for requesting a pre-paid amount gift may involve a Tasman browser or other web-based browser running on set-top box 124-1 and requesting a URL associated with the unified storefront 201. In response to operation 315, in operation 317 the unified storefront 201 confirms receipt of the request for the purchase of the pre-paid amount gift and prompts the user of set-top box 124-1 for verification that he or she wants to purchase the pre-paid amount gift. In operation 319, the user of set-top box 124-1 sends confirmation to unified storefront 201 that the user wishes to order the pre-paid amount gift for the user of set-top box 124-2. In operation 321, unified storefront 201 sends a request to service delivery platform 203 for the requested content. In operation 323, service delivery platform 203 acknowledges the receipt of the request to unified storefront 201. Upon unified storefront 201 receiving acknowledgment from service delivery platform 203 that the request is being processed by the service delivery platform 203, in operation 325 the unified storefront 201 sends a payment request or other form of invoice. In an embodiment, operation 327 relates to the user of set-top box 124-1 making a payment choice. For example, the user of set-top box 124-1 may enter credit card payment information to be used in paying for the gift. In some embodiments, credit card credentials are stored in set-top box 124-1 and accessed automatically or in response to one or more user commands. Unified storefront 201 receives the payment choice information in operation 327 and conveys the payment choice information in operation 329 to the service delivery platform 203. Depending upon the payment option selected, the service delivery platform 203 may either send the payment information to payment module 213 or add an entry to a bill payment system associated with the first user. For example, a bill payment system may be associated with IPTV network 207 and another bill payment system may be associated with mobile phone network 209. In operation 331, the service delivery platform 203 requests a payment from payment module 213. Payment module 213 may be an external credit card payment system that is subscribed to by the service provider network operator. Payment credentials received during operation 327 may be used in operation 331 to promote security and reduce payment fraud. In operation 339, service delivery platform 203 notifies unified storefront 201 that the service delivery platform 203 has authorized the grant of the pre-paid amount gift by the appropriate network (e.g. IPTV network 207 or telephone network 209) and that payment has been requested. In turn, in operation 341, unified storefront 201 notifies the user of set-top box 124-1 of the status of the transaction. In some embodiments, notification provided in operation 341 includes information that the pre-paid amount gift has been granted and payment has been received or billed. In operation 343, service delivery platform 203 updates relevant spending limits associated with set-top box 124-1. Spending limits associated with set-top box 124-1 may be for a single account associated with the set-top box, or may be associated with a particular user of set-top box 124-1 in the event that multiple users have corresponding accounts related to the set-top box. In operation 345, service delivery platform 203 prompts IPTV network 207 to update credit limits associated with set-top box 124-1 or the user of set-top box 124-1. Operation 345 occurs if the pre-paid amount gift is related to IPTV network 207, such as if the pre-paid amount gift is for $20 to be applied to the gift recipient's IPTV network fees. In operation 347, service delivery platform 203 prompts telephone network 209 to update credit limits associated with set-top box 124-1 or the user of set-top box 124-1 if the pre-paid amount gift is to be applied to the gift recipient's account related to telephone network 209. In operation 349, unified storefront 201 presents or notifies the user of set-top box 124-2 of the pre-paid amount gift. Presentation of the gifted asset may be, for example, by an e-mail message, text message, or screen image that may be generated by set-top box 124-2. In operation 351, the user of set-top box 124-2 requests to use or consume the pre-paid amount gift.

FIG. 2 and FIG. 3 each relate to methods for a first user purchasing a gift for a second user using a service provider network. In the illustrated embodiments, a set-top box is used to communicate with a unified storefront to purchase a gift. The use of a set-top box for purchasing the asset is for illustrative purposes and is not meant to limit the claimed subject matter to using a set-top box for accessing the unified storefront. Unified storefront 201 also supports using other devices for purchasing the gifts. For example, a mobile telephone device may communicate with unified storefront 201 to present a user with a graphical user interface for requesting the gift. In some embodiments a mobile telephone device, a personal digital assistant, or another device may execute software that accesses a URL associated with unified storefront 201 to provide the user of the telephone device with a graphical user interface for ordering the gift. In some embodiments, the graphical user interface presented to the user of a portable electronic device resembles the graphical user interface presented to the user of a set-top box during access of the unified storefront. In some embodiments, a user may interact with a personal computer or other data processing system that operates a web browser or other software to access a URL associated with unified storefront 201. In summary, the hardware components depicted in block diagram form in FIG. 2 and FIG. 3 are provided for illustrative purposes only and are not meant to be restrictive regarding the hardware components that may be used to accomplish methods 200 and 300.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A gift purchasing method comprising:
providing a network server of a multimedia provider network with a processor-executable storefront program hosting a plurality of storefront interfaces, the plurality of storefront interfaces including a mobile storefront interface accessible to a mobile device of a first user of the multimedia provider network and a set-top box storefront interface accessible to a set-top box of the first user, wherein the network server includes a processor that, when executing the storefront program, performs operations comprising;
responsive to receiving, from the mobile device, a gift request, wirelessly transmitted via a mobile telephone network, indicating a network-deliverable gift and a second user of the multimedia provider network, determining, by the network server, a type of the network-deliverable gift, wherein the type of the network-deliverable gift is selected from a multimedia gift including multimedia content and a mobile device gift;
determining, by the network server based on the type of the network-deliverable gift, a delivery network appropriate for the network-deliverable gift, wherein the delivery network is selected from the multimedia provider network and the mobile telephone network;
automatically selecting, by the network server, a network-deliverable asset corresponding to the network-deliverable gift and compatible with a device of the second user;
authorizing, by the network server, delivery of the network-deliverable asset to the device of the second user via the delivery network;
notifying the second user of the network-deliverable gift; and
delivering the network-deliverable asset to the device of the second user to configure the device of the second user for playback of the network-deliverable asset.

2. The method of claim 1, further comprising:
receiving payment credentials from the first user; and
accessing a payment module with the payment credentials in response to receiving a payment associated with the network-deliverable gift.

3. The method of claim 2, further comprising:
verifying the payment credentials of the first user; and
requesting compensation from a billing system using the payment credentials.

4. The method of claim 3, further comprising:
notifying the first user of receiving the payment.

5. The method of claim 2, wherein a unified storefront provided by the multimedia provider network receives the first request and notifies a service delivery platform of the network-deliverable gift request, wherein the method includes:
updating a billing account associated with the payment credentials.

6. The method of claim 5, wherein the billing account is associated with the mobile device.

7. The method of claim 5, wherein the multimedia provider network includes an Internet protocol television network and wherein the multimedia content includes Internet protocol television content.

8. The method of claim 7, further comprising:
retrieving the payment credentials from a set-top box wherein the set-top box is configured to access the unified storefront using a universal resource locator.

9. The method of claim 1, wherein the multimedia provider network includes a co-axial cable television network.

10. The method of claim 1, wherein the network-deliverable gift is a telephone asset and the asset is a ring tone compatible with a mobile telephone of the second user.

11. The method of claim 1, wherein the network-deliverable gift is a multimedia provider network asset and the asset is a video on demand content.

12. A non-transitory computer readable medium, including processor executable program instructions for a storefront program hosting a plurality of storefront interfaces, the plurality of storefront interfaces including a mobile storefront interface accessible to a mobile device of a first user of a multimedia provider network, that, when executed by a processor, cause the processor to perform operations comprising:
providing a network server of a multimedia provider network with a processor-executable storefront program hosting a plurality of storefront interfaces, the plurality of storefront interfaces including a mobile storefront interface accessible to a mobile device of a first user of the multimedia provider network, wherein the network server includes a processor that, when executing the storefront program, performs operations comprising;

responsive to receiving, from the mobile device, a gift request, wirelessly transmitted via a mobile telephone network, indicating a network-deliverable gift and a second user of the multimedia provider network, determining, by the network server, a type of the network-deliverable gift, wherein the type of the network-deliverable gift is selected from a multimedia gift including multimedia content and a mobile device gift;

determining, by the network server based on the type of the network-deliverable gift, a delivery network appropriate for the network-deliverable gift, wherein the delivery network is selected from the multimedia provider network and the mobile telephone network;

automatically selecting, by the network server, a network-deliverable asset corresponding to the network-deliverable gift and compatible with a device of the second user;

authorizing, by the network server, delivery of the network-deliverable asset to the device of the second user via the delivery network;

notifying the second user of the network-deliverable gift; and delivering the network-deliverable asset to the device of the second user to configure the device of the second user for playback of the network-deliverable asset.

13. The computer readable memory medium of claim 12, wherein the network-deliverable gift request indicates a particular title of a particular multimedia gift.

14. The computer readable memory medium of claim 13, wherein the network-deliverable gift request indicates a condition on content with which the asset must comply.

15. The computer readable memory medium of claim 13, wherein the operations include:

processing a request from the first user specifying characteristics of music for purchase using the network-deliverable gift.

16. An application server associated with a multimedia provider network, the application server including:

a processor;

a computer readable memory medium including processor executable instructions for a storefront program hosting a plurality of storefront interfaces, the plurality of storefront interfaces including a mobile storefront interface accessible to a mobile device of a first user of the multimedia provider network, that, when executed by the processor, cause the processor to perform operations comprising:

responsive to receiving, from the mobile device, a gift request, wirelessly transmitted via a mobile telephone network, indicating a network-deliverable gift and a second user of the multimedia provider network, determining, by the network server, a type of the network-deliverable gift, wherein the type of the network-deliverable gift is selected from a multimedia gift including multimedia content and a mobile device gift;

determining, by the network server based on the type of the network-deliverable gift, a delivery network appropriate for the network-deliverable gift, wherein the delivery network is selected from the multimedia provider network and the mobile telephone network;

automatically selecting, by the network server, a network-deliverable asset corresponding to the network-deliverable gift and compatible with a device of the second user;

authorizing, by the network server, delivery of the network-deliverable asset to the device of the second user via the delivery network;

notifying the second user of the network-deliverable gift; and delivering the network-deliverable asset to the device of the second user to configure the device of the second user for playback of the network-deliverable asset.

17. The application server of claim 16, wherein the operations include:

decreasing a spending limit associated with an account associated with the network-deliverable gift.

18. The application server of claim 16, wherein the network-deliverable gift is a multimedia provider network asset.

19. The application server of claim 18, wherein the network-deliverable gift is a ring tone for a mobile telephone.

20. The application server of claim 18, wherein the network-deliverable gift is a video-on-demand movie.

21. The application server of claim 18, wherein the network-deliverable gift is a pay-per-view sporting event.

22. The application server of claim 16, wherein the network-deliverable gift is a monetary credit.

23. The application server of claim 16, wherein the operations include:

sending, to the mobile device of the first user, a gift request user interface; and receiving the network-deliverable gift request from the user interface.

* * * * *